United States Patent [19]
Sureau et al.

[11] 3,767,361
[45] Oct. 23, 1973

[54] PROCESS FOR DYEING POLYACRYLONITRILE FIBERS WITH METHINE DYES

[75] Inventors: Robert Frederic Michel Sureau, Enghien Les Bains; Victor Marie Dupre, Louvres, both of France

[73] Assignee: Ugine Kuhlmann, Paris, France

[22] Filed: Sept. 16, 1971

[21] Appl. No.: 181,253

Related U.S. Application Data
[62] Division of Ser. No. 14,622, Feb. 26, 1970, abandoned.

[30] Foreign Application Priority Data
Mar. 7, 1969 France .................................. 690373

[52] U.S. Cl. ........................... 8/177 AB, 260/240 F
[51] Int. Cl. ............................................. D06p 3/76
[58] Field of Search ............... 8/177 AB; 260/240 F

[56] References Cited
UNITED STATES PATENTS

| | | | |
|---|---|---|---|
| 3,122,517 | 2/1964 | Kauckenberg et al. | 8/177 AB X |
| 3,185,538 | 5/1965 | Voltz et al. | 8/177 AB X |
| 3,299,055 | 1/1967 | Klingsberg | 8/177 AB X |

OTHER PUBLICATIONS
Ishii et al., Nippon Nogeikagaku Kaishi 40 (12), pp. 437-442, (1966), Chem. Abstracts.

*Primary Examiner*—Leon D. Rosdol
*Assistant Examiner*—T. J. Herbert, Jr.
*Attorney*—Beveridge & Degrandi

[57] ABSTRACT

A process for the colouration of fibres based on polymers or copolymers of acrylonitrile using dyes of the formula:

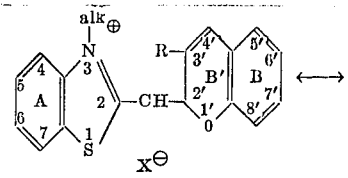

(I)

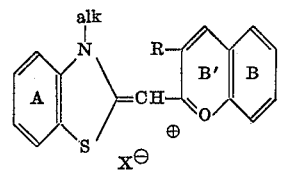

wherein alk represents an alkyl group possessing a small number of carbon atoms, the nucleus A is unsubstituted or substituted by at least one halogen atom, alkyl, alkoxy, nitro, amino or acylamino group or fused to a benzene nucleus, the nucleus B is unsubstituted or substituted by at least one halogen atom, alkyl, alkoxy or nitro group or fused to a benzene ring, R represents a hydrogen atom, an alkyl, nitrile, alkoxycarbonyl or phenyl group, the nucleus B' may be fused to a benzene nucleus in the 3',4' position and X represents a monovalent anion, and fibres based on polymers or copolymers of acrylonitrile coloured by these dyes.

7 Claims, No Drawings

PROCESS FOR DYEING POLYACRYLONITRILE FIBERS WITH METHINE DYES

This application is a divisional application on application Ser. No. 14,622 filed Feb. 26, 1970 and now abandoned.

The present invention concerns the dyeing of polyacrylic fibres by means of methine dyes.

The dyeing of fibres based on polymers or copolymers of acrylonitrile by means of basic dyes, in particular by means of methine dyes, is known.

The range of these dyes is poor however in industrially readily accessible reddish yellow to orange products which give brilliant shades and possess a high tinctorial yield and good fastness. It is the aim of the present invention to increase this range.

According to the present invention, a process for the colouration of fibres based on polymers or copolymers of acrylonitrile comprising applying to the fibres a dye of the following general formulae:

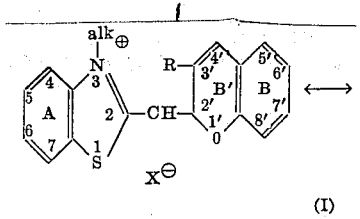

(I)

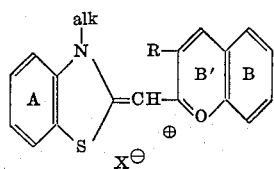

wherein alk represents an alkyl group having a small number of carbon atoms, preferably a methyl or ethyl group, the nucleus A may be substituted by at least one halogen atom, alkyl, alkoxy, nitro, amino or acrylamino group or it may be fused to a benzene ring, the nucleus B may be substituted by at least one halogen atom, alkyl, alkoxy or nitro group or it may be fused to a benzene ring, R represents a hydrogen atom, an alkyl, nitrile, alkoxycarbonyl or phenyl group, the nucleus B' may be fused to a benzene ring in the 3',4' position and X represents a monovalent anion.

The synthesis of dyes of formula (I) may be effected, for example, by two different methods:

1. According to a first type of reaction, a 2-methylene-3-alkyl-benzothiazoline of formula (II) may be condensed with a 2-thio-coumarin of formula

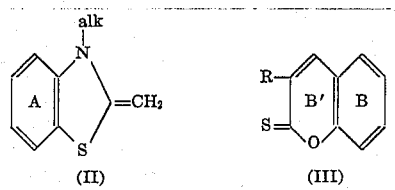

wherein the symbol alk and the letters A, B, B' and R have the same meanings as above.

In this method the reaction medium is a weak organic acid such as acetic or propionic acid and the temperature used is near boiling point. The reaction can be greatly accelerated and the yields can be substantially improved by the addition of an alkylating agent preferably in a quantity which is equal to or greater than the stoichiometric quantity. One notes in this case the separation of alkylmercaptan, probably owing to the intermediate formation of a very reactive methyl thiooxonium compound. All the classical alkylating agents are effective. Among these may be mentioned methyl or ethyl sulphate, alkyl halides, alkyl arylsulphonates and in particular methyl or ethyl chloro- or bromoacetate. The dye is separated in general by dilution, possible filtration in the presence of carbon black so as to eliminate any impurities, and precipitation by the addition to the filtrate of sodium chloride and, if necessary, zinc chloride.

2. In the second type of reaction a 3-alkyl benzothiazolium salt of formula (IV) or (V) may be condensed with a 2-methyl benzopyrylium salt of formula

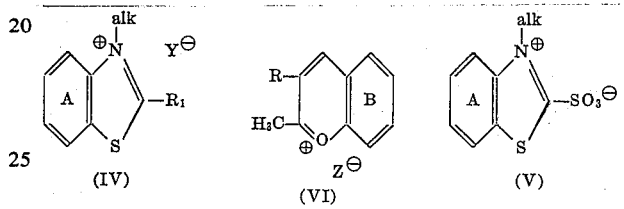

In the formulae (IV) and (V) the symbol alk and A have the same meanings as in formulae (I) and (II), Y represents a monovalent anion, $R_1$ represents a chlorine atom or a thio-alkyl group. In formula (VI) B has the same meanings as in formulae (I) and (III), R represents a hydrogen atom or an alkyl radical and Z represents a monovalent anion, usually the chloroferrate anion $Cl_4Fe-$ because of the preferred method of synthesis of salts of this type in accordance with a known process.

In this method a large number of organic solvents are suitable for use as a reaction medium. Preferably a water-miscible solvent is chosen, for example: a lower alcohol, a polyalcohol such as glycol, an ester of the latter, dimethylformamide, dimethyl sulphoxide or a weak organic acid such as acetic or propionic acid. The reaction often commences at ordinary room temperature but it is sometimes necessary to heat up to reflux of the solvent. The duration of the operation is extremely variable, from a few minutes to several hours depending on the nature of $R_1$ and that of the substituents. The dye formed, which is generallly slightly soluble in the reaction medium, is filtered, washed with the solvent then with water and dried at moderate temperature or in vacuum.

Among the pyrylium salts of formula (VI) some are already known; others are new. In a general manner, they can be prepared by condensation of an aldehyde of formula:

(VII)

with a ketone of formula: $CH_3$-CO-$CH_2$-R in the presence of a strong mineral acid. Suitable pyrylium salts of formula (VI) for use as starting materials for this method of the production of dyes used in this invention are, for example, the 2,3-dimethyl benzopryrlium, 2-methyl-3-isopropyl benzopyrylium, 2-methyl-3-butyl benzopyrylium, 2,3-dimethyl-naphtho[b]pyrylium, 2-methyl-3-isopropyl-naphtho[b]pyrylium and 2-methyl-3-butyl-naphtho[b]pyrylium salts and their substituted derivatives.

Dyes of similar formulae have already been prepared by A. I. Kiprianov, A.I. Tolmatchev and their collaborators (Journal of General Chemistry USSR Vol. 30 – I p.638, Vol.32–I— p.383, Vol. 33–I—p.44) but the latter dyes, obtained in accordance with different processes in bad yields are more difficultly accessible on an industrial scale.

The dyes used in accordance with the invention provide all the properties of cationic dyes and are particularly suitable for the dyeing of fibres based on polymers or copolymers of acrylonitrile since they possess a very strong affinity for these fibres. They confer on them full-bodied shades of great brilliance in the range of yellows and oranges. The dyeings obtained have excellent general fastness properties.

In the following Examples, which are purely illustrative the parts are by weight unless otherwise stated.

EXAMPLE 1

A solution of 3 parts of 2-thio-coumarin and 3 parts of 2-methylene-3-methyl-benzothiazoline in a mixture of 20 parts of glacial acetic acid and 3 parts by volume of dimethyl sulphate is brought to the boil for 2 hours. The solution is diluted with 100 parts of water, a little carbon black is added, filtered and the dye is precipitated by the addition of 15 parts of sodium chloride to the filtrate. The solid is filtered and dried at moderate temperature. 1.6 parts of a dye is obtained which dyes fibres based on polyacrylonitrile in a very brilliant and full-bodied shade of golden yellow having very good general fastness in particular fastness to light.

EXAMPLE 2

A mixture of 3 parts of 2-thio-coumarin, 3.6 parts of 2-methylene-3,6-dimethyl-benzothiazoline in 20 parts of glacial acetic acid and 3 parts of ethyl chloroacetate is brought to the boil for 8 hours. 80 parts of cold water are added. The crystalline precipitate formed is filtered, then redissolved in 150 parts of hot water, a little carbon black is added, filtered and to the still warm filtrate are added 20 parts of sodium chloride. The mixture is allowed to cool, filtered and the solid is dried at moderate temperature. 4.2 parts of an orange dye is obtained which dyes polyacrylic fibres in a golden yellow shade having qualities analogous to those of the dye of Example 1.

EXAMPLE 3

A mixture of 3.5 parts of 2,3-dimethyl benzopyrylium chloroferrate, 2.3 parts of 3-methyl-benzothiazolio-2-sulphonate in 100 parts of glacial acetic acid is brought to the boil for 10 minutes. A crystalline precipitate is formed rapidly. After cooling it is filtered, washed with acetic acid until the purplish-red mother liquor has been eliminated, drained and dried in vacuum 3.7 parts of an orange dye are obtained which dyes polyacrylic fibres in a brilliant yellow shade having properties close to those of the dye of Example 1.

The 2,3-dimethyl-benzopyrylium chloroferrate used in this Example may be prepared for example in accordance with Elderfield "Heterocyclic compounds," 1951, Vol II p.292 or in the following manner:

A mixture of 200 parts by volume of glacial acetic acid, 120 parts of crystallized ferric chloride ($FeCl_3 \cdot 6H_2O$), 48.8 parts of salicyclic aldehyde and 72 parts of methyl ethyl ketone are stirred together until a solution is obtained. Stirring is continued and, within a period of approximately 4 hours and at a temperature of 15° to 20°C., 300 parts by volume of concentrated hydrochloric acid are added. The solution turns deep red and the benzopyrylium salt commences to crystallize. After 24 hours of stirring at ambient temperature, the solid is filtered, washed twice with a mixture of 20 parts by volume of acetic acid and 30 parts by volume of concentrated hydrochloric acid, drained, and dried vacuum. 133 parts of 2,3-dimethyl benzopyrylium chloroferrate are obtained in the form of a reddish crystalline powder. The reddish coloration is due to a trace of oxidation products but the crude product is in a state of sufficient purity for the synthesis of dyes.

The compound may be obtained in pure state by recrystallization in acetic acid in the presence of decolorizing carbon. Light greenish yellow prisms. M.Pt. = 106° to 107°C.

Analysis Calculated for $C_{11}H_{11}Cl_4FeO$

|  | %C 36.98 | H 3.08 | Cl 39.78 | Fe 15.68 |
|---|---|---|---|---|
| Found | 36.9 | 3.32 | 40.4 | 15.6 |
|  | 37.3 | 3.21 | 40.6 | 16.0 |

In the same manner other pyrilium salts may be prepared by replacing the salicylic aldehyde by its halogenated, methylated or methoxylated derivatives or by 2-hydroxy-1-naphthaldehyde or by substituting methyl ethyl ketone by acetone, methylisobutyl ketone or methyl amylketone. It is sometimes advantageous to use anhydrous gaseous hydrochloric acid instead of concentrated hydrochloric acid.

EXAMPLE 4

A mixture of 3.5 parts of 2,3-dimethyl benzopyrylium chloroferrate, 3.5 parts of 2-methylthio-3-methyl-6-nitro-benzothiazolium sulphomethylate in 100 parts of glacial acetic acid is brought to the boil for 5 hours. The mixture is allowed to cool, filtered, the precipitate is taken up in 50 parts of boiling ethanol to eliminate a red impurity, filtered, washed with ethanol and dried at moderate temperature, 3 parts of an orange dye in the state of chloroferrate is recovered which dyes polyacrylic fibres in a yellow-orange shade of very good general fastnesses.

The following Table summarizes supplementary Examples of the use of dyes of formula I in dyeing fibres in accordance with the invention where alk represents $CH_3$; the substituents of the nuclei A, B and B' are those indicated in the second column. The anion plays no part in the dyeing of the fibres and according to the manner of preparation used, is $Cl^-$, $ZnCl^-3$ or $Cl_4Fe^-$. If desired for example for reasons of solubility, it may be substituted by another anion.

| Example | Substituents | Shades on polyacrylic fibres |
|---|---|---|
| 5 | 6-methoxy | Golden orange |
| 6 | 6-chloro | Golden yellow |
| 7 | 30'-methyl-8'-methoxy | Yellow |
| 8 | 6-nitro-3'-methyl-8'-methoxy | Yellow |
| 9 | 3'-methyl-5',6'-benzo | Vivid orange |
| 10 | 5,3'-dimethyl | Yellow |
| 11 | 6-methyl-6'-bromo | Golden orange |
| 12 | 6-methoxy-6'-bromo | Orange |
| 13 | 6-chloro-6'-bromo | Do. |
| 14 | 3'-methyl-6'-bromo | Golden yellow |
| 15 | 3'-methyl-6'-chloro | Vivid yellow green |
| 16 | 6,7-benzo-6'-bromo | Vivid orange |
| 17 | 6-methoxy-3'-methyl | Golden yellow |

| | | |
|---|---|---|
| 18 | 6,3'-dimethyl | Do. |
| 19 | 5-methoxy-3'-methyl | Do. |
| 20 | 5-methoxy-6-acetylamino-3'-methyl | Orange |
| 21 | 5-chloro-3'-methyl | Yellow |
| 22 | 6-chloro-3'-methyl | Golden yellow |
| 23 | 6'-bromo | Do. |
| 24 | 6'-chloro | Do. |
| 25 | 6,6',8'-trimethyl | Golden orange |
| 26 | 6-methoxy-6',8'-dimethyl | Orange |
| 27 | 6-chloro-6'-8'-dimethyl | Golden orange |
| 28 | 6,7-benzo-6',8'-dimethyl | Orange |
| 29 | 6,7-benzo-3'-methyl | Orange |
| 30 | 6-methyl-7'-methoxy | Vermillion |
| 31 | 6,7-benzo-7'-methoxy | Orange |
| 32 | 6,7'-dimethoxy | Do. |
| 33 | 6-chloro-7'-methoxy | Do. |
| 34 | 6-methyl-3',4'-benzo-7'-methoxy | Golden yellow |
| 35 | 6-methoxy-3',4'-benzo-7'-methoxy | Yellow |
| 36 | 6-chloro-3',4'-benzo-7'-methoxy | Golden yellow |
| 37 | 6-methyl-3'-phenyl | Do. |
| 38 | 6-methoxy-3'-phenyl | Golden orange |
| 39 | 6-chloro-3'-phenyl | Do. |
| 40 | 6-methyl-8'-methoxy | Golden yellow |
| 41 | 6,8'-dimethoxy | Golden orange |
| 42 | 8'-methoxy-6-chloro | Golden yellow |
| 43 | 6,7-benzo-8'-methoxy | Orange |
| 44 | 6-methyl-6'-nitro | Golden yellow |
| 45 | 6-methoxy-6'-nitro | Brownish yellow |
| 46 | 6-chloro-6'-nitro | Yellow |
| 47 | 6,7-benzo-6'-nitro | Chamois yellow |
| 48 | 6',8'-dimethyl | Golden orange |
| 49 | 7'-methoxy | Orange |
| 50 | 8'-methoxy | Golden yellow |
| 51 | 3'-phenyl | Golden orange |
| 52 | 6'-nitro | Yellow |
| 53 | 3'4'-benzo-7'-methoxy | Golden yellow |
| 54 | 3'-isopropyl | Golden-yellow |
| 55 | 3'-n-butyl | Golden yellow |

We claim:

1. A process for the colouration of fibres based on acrylonitrile polymers which comprises applying to the fibres a dye of the formula:

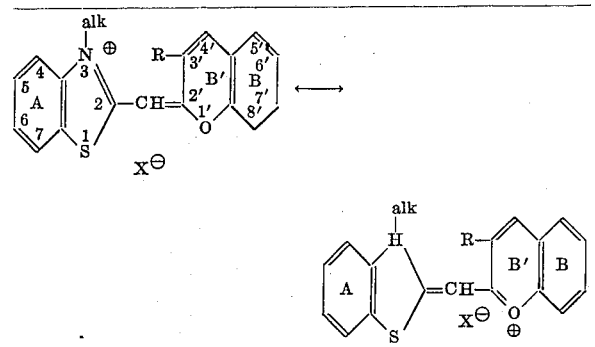

wherein alk is methyl or ethyl, the nucleus A is unsubstituted or substituted by at least one halogen atom, methyl, methoxy, nitro, amino or acylamino group or fused to a benzene nucleus, the nucleus B is unsubstituted or substituted by at least one halogen atom, methyl, methoxy or nitro group or fused to a benzene ring, R is hydrogen, alkyl containing one to four carbon atoms, nitrile, methoxycarbonyl, or phenyl, the nucleus B' may be fused to a benzene nucleus in the 3'4' position, and X⁻ represents a monovalent anion.

2. A process according to claim 1 wherein the dye applied to the fibres has the formula:

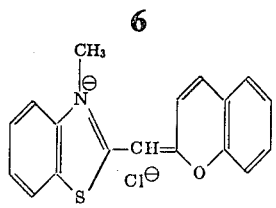

3. A process according to claim 1 wherein the dye applied to the fibres has the formula:

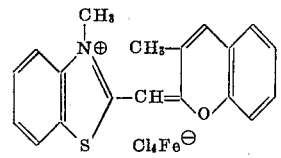

4. A process according to claim 1 wherein the dye applied to the fibres has the formula:

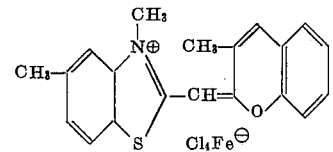

5. A process according to claim 1 wherein the dye applied to the fibres has the formula:

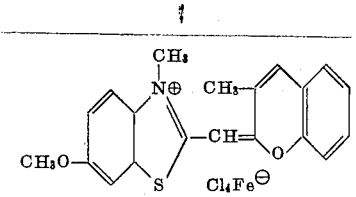

6. A process according to claim 1 wherein the dye applied to the fibres has the formula:

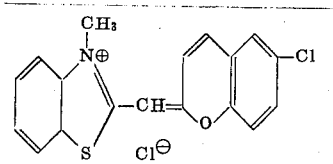

7. Fibres based on polymers of acrylonitrile coloured by a dye as defined in claim 1.

* * * * *

UNITED STATES PATENT OFFICE
CERTIFICATE OF CORRECTION

Patent No. 3,767,361        Dated October 23, 1973

Inventor(s) Robert Frederic Michel Sureau et al.

It is certified that error appears in the above-identified patent and that said Letters Patent are hereby corrected as shown below:

On the cover sheet item [30] "Mar. 7, 1969   France   690373" should read -- Mar. 7, 1969   France   6,906,373 --.

Signed and sealed this 2nd day of April 1974.

(SEAL)
Attest:

EDWARD M.FLETCHER,JR.
Attesting Officer

C. MARSHALL DANN
Commissioner of Patents